United States Patent
Daley et al.

(10) Patent No.: US 12,472,927 B2
(45) Date of Patent: Nov. 18, 2025

(54) HYDROGEN HYBRID PROPULSION SYSTEM

(71) Applicant: FCA US LLC, Auburn Hills, MI (US)

(72) Inventors: James J Daley, Jackson, MI (US);
Ettore Musu, Formigine (IT); Justin Hutchings, Lake Orion, MI (US);
Ronald A Reese, II, Goodrich, MI (US); Halim G Santoso, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 326 days.

(21) Appl. No.: 18/341,112

(22) Filed: Jun. 26, 2023

(65) Prior Publication Data
US 2024/0425033 A1    Dec. 26, 2024

(51) Int. Cl.
*B60W 20/13*  (2016.01)
*B60W 10/06*  (2006.01)
*B60W 10/26*  (2006.01)
*B60W 10/28*  (2006.01)
*B60W 20/15*  (2016.01)

(52) U.S. Cl.
CPC ............ *B60W 20/13* (2016.01); *B60W 10/06* (2013.01); *B60W 10/26* (2013.01); *B60W 10/28* (2013.01); *B60W 20/15* (2016.01); *B60W 2510/0676* (2013.01); *B60W 2510/244* (2013.01); *B60W 2510/285* (2013.01); *B60W 2510/30* (2013.01); *B60W 2555/20* (2020.02)

(58) Field of Classification Search
CPC ...... B60W 20/13; B60W 10/06; B60W 10/26; B60W 10/28; B60W 20/15; B60W 2510/0676; B60W 2510/244; B60W 2510/285; B60W 2510/30; B60W 2555/20; Y02T 90/40
See application file for complete search history.

(56) References Cited

FOREIGN PATENT DOCUMENTS

| CN | 109795374 A | * | 5/2019 | |
|---|---|---|---|---|
| CN | 108839577 B | * | 7/2021 | |
| WO | WO 2022057371 A1 | * | 3/2022 | ............ B63H 21/17 |

* cited by examiner

Primary Examiner — Brian P Sweeney
(74) Attorney, Agent, or Firm — Jeremy J. Klobucar

(57) ABSTRACT

A hybrid propulsion system for a vehicle includes an internal combustion engine (ICE), a fuel cell, a hydrogen storage tank, a battery pack, an electric drive motor and a controller. The ICE has a first output that drives a generator, the generator providing a first output voltage. The fuel cell has a second output providing a second output voltage. The hydrogen storage tank is configured to store hydrogen and selectively and alternatively supply the hydrogen to both of the ICE and the fuel cell. The battery pack selectively and alternatively receives the first and second output voltage to charge the battery pack. The controller receives vehicle inputs and determines operational set points of the ICE and the fuel cell representative of an amount of the first and second output voltage to direct to the battery pack based on operating conditions.

16 Claims, 3 Drawing Sheets

HYDROGEN HYBRID PROPULSION SYSTEM

FIELD

The present application generally relates to vehicle propulsion systems and, more particularly, to a hydrogen hybrid propulsion system for a medium or heavy duty vehicle and related control strategy.

BACKGROUND

Conventional gasoline and diesel engines can provide acceptable power output for most vehicles but may have undesirable carbon emissions. Alternative propulsion systems that have less carbon emissions are becoming more popular. For example, an electrified vehicle (hybrid electric, plug-in hybrid electric, range-extended electric, battery electric, etc.) includes at least one battery system and at least one electric motor. Hydrogen fuel cell stack technology can also provide an associated powertrain suitable propulsion for most applications.

Generally speaking, alternative propulsion systems that replace gasoline and diesel engines, while offering reduced carbon emissions can suffer from other challenges. For example, medium and heavy duty vehicles, such as medium and heavy duty passenger pick-up trucks, require propulsion systems with increased power relative to conventional passenger cars and trucks. Many electrified vehicles can offer the required torque for medium and heavy duty operation but struggle to provide suitable packaging space that can accommodate batteries needed to properly power such propulsion systems. Hydrogen fuel cell stack vehicles generally struggle to provide enough power to match the demand of a heavy duty vehicle. Like an electrified vehicle, increasing the hydrogen fuel cell stack power output would require significant packaging space to accommodate hydrogen storage needed to match the power demand. In sum, it is a challenge to provide a propulsion system for a medium or heavy duty vehicle that meets the required power demand while remaining low on emissions. Accordingly, while such conventional vehicle propulsion systems well for their intended purpose, there exists an opportunity for improvement in the relevant art.

SUMMARY

According to one example aspect of the invention, a hybrid propulsion system for a vehicle includes an internal combustion engine (ICE), a fuel cell, a hydrogen storage tank, a battery pack, an electric drive motor and a controller. The ICE has a first output that drives a generator, the generator providing a first output voltage. The fuel cell has a second output providing a second output voltage. The hydrogen storage tank is configured to store hydrogen and selectively and alternatively supply the hydrogen to both of the ICE and the fuel cell. The battery pack selectively and alternatively receives the first and second output voltage to charge the battery pack. The electric drive motor receives power from the battery pack to drive a drive wheel of the vehicle to propel the vehicle. The controller receives vehicle inputs and determines operational set points of the ICE and the fuel cell representative of an amount of the first and second output voltage to direct to the battery pack based on operating conditions.

In some implementations, the controller further comprises a hydrogen system optimization battery control module that determines an optimized battery output based on the operational set points of the ICE and the fuel cell. The operational set points of the ICE and the fuel cell are consistent with an amount of hydrogen delivered to the ICE and the fuel cell.

In some implementations, the hydrogen system optimization battery control module receives a first input from a fuel cell efficiency algorithm that determines an optimal operating efficiency of the fuel cell based on the operating conditions. The operating conditions comprise fuel cell operating inputs including at least one of a fuel cell aftertreatment temperature input, a fuel cell temperature input, a fuel cell humidity input, and a balance of plant (BOP) load input.

According to another example aspect of the invention, the hydrogen optimization battery control module receives a second input from an ICE efficiency algorithm that determines an optimal operating efficiency of the ICE based on the operating conditions. The operating conditions comprise ICE operating inputs including at least one of an ICE coolant temperature, an ICE intake air temperature input, an ICE oil temperature input, an ICE aftertreatment temperature input, and a fuel cell water output.

In some implementations, the hydrogen optimization battery control module receives a third input from vehicle data input including at least one of a hydrogen tank pressure input of the storage tank, an ambient temperature input, an altitude input, a battery voltage input of the battery pack, a heating ventilation and air conditioning (HVAC) request input, a driving mode input, an advanced driver assistance system (ADAS) driving status and a hydrogen purity input, wherein the propulsion system optimized battery output is further based on the third input.

In some implementations, the hydrogen optimization battery control module receives a fourth input from a hydrogen supervisory transient system control module. The fourth input is based on inputs from a short term control module representative of short term driving conditions and a long term control module representative of long term driving conditions.

In other features, the short term control module determines a vehicle demand energy based on at least one of a driver requested speed and a propulsion system load. The long term control module provides the input to the hydrogen optimization battery control module based on external geographical inputs comprising at least one of a jurisdiction input, a traffic input, a grade input, and a GPS trip planner input.

A method of operating a hybrid propulsion system for a vehicle is provided. The hybrid propulsion system includes an internal combustion engine (ICE) and a fuel cell, the ICE having a first output that drives a generator, the generator providing a first output voltage to a battery pack, the fuel cell having a second output providing a second output voltage to the battery pack. The method includes determining an optimal operating efficiency of the fuel cell based on operating conditions. An optimal operating efficiency of the ICE is determined based on operating conditions. A hydrogen system optimization battery control module receives the optimal operating efficiencies of the fuel cell and the ICE and determines an optimized battery output including operational set points of the ICE and the fuel cell based on the optimal operating efficiencies of the fuel cell and the ICE. The method further includes operating, selectively and alternatively, the fuel cell and the ICE based on the operational set points of the fuel cell and the ICE.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, it is challenging to provide a propulsion system for a medium and heavy duty vehicle, such as a medium and heavy duty passenger pickup, that offers adequate power while meeting reduced carbon emission goals. The instant disclosure provides a dual propulsion system including an internal combustion engine and a fuel cell stack that both run on a common hydrogen fuel source. As is known, a fuel cell stack is a zero emissions system that uses hydrogen as an input and outputs water as a byproduct. Similarly, the internal combustion engine is configured to run on supplied hydrogen while having minimal nitrogen oxide ($NO_x$) emission as a byproduct output. The resulting hybrid system provides suitable power output while also reducing carbon emissions over similarly powered conventional gas and diesel engine powertrains.

Figure 1:
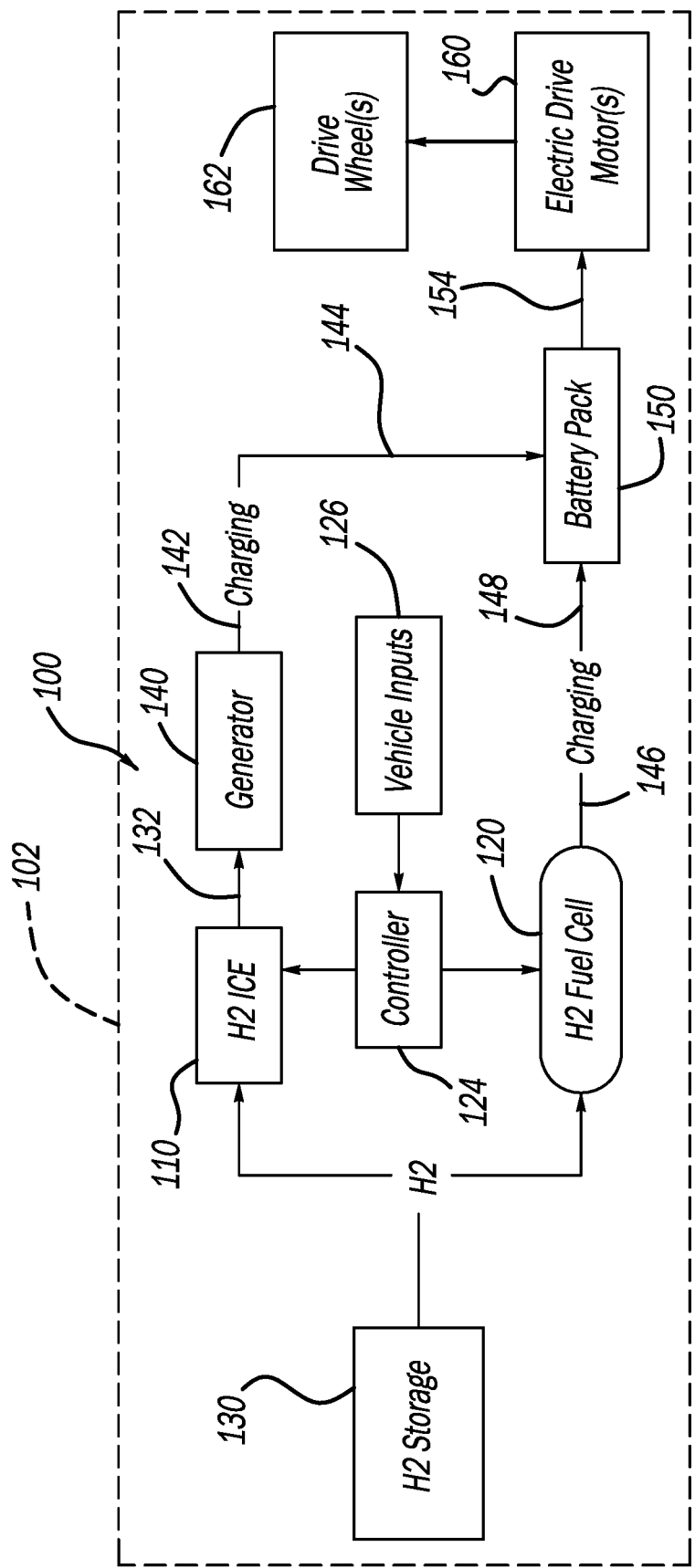
FIG. 1 is a functional block diagram of a hydrogen hybrid propulsion system incorporating an internal combustion engine and a fuel cell that both run on hydrogen fuel according to the principles of the present application.

With initial reference to FIG. 1, a hydrogen hybrid propulsion system constructed in accordance to one example of the present disclosure is shown and generally identified at reference 100. The hydrogen hybrid propulsion system 100 is configured to provide propulsion to a vehicle 102. The hydrogen hybrid propulsion system 100 generally includes an internal combustion engine (ICE) 110 and a fuel cell 120. As used herein a "fuel cell" is used to refer to a fuel cell stack having hundreds of fuel cells configured to generate electricity in the form of direct current from electrochemical reactions in the fuel cells. Both of the ICE 110 and the fuel cell 120 are fueled by hydrogen from a hydrogen storage tank 130. In examples, the hydrogen storage tank 130 can be a common hydrogen storage tank 130 (or tanks) that fuels the ICE 100 and fuel cell 120 concurrently or alternately as demand dictates. A controller 124 sends signals to the ICE 110 and the fuel cell 120 based on data received from vehicle inputs 126 as will be described in more detail herein.

The ICE 110 includes an output 132 that drives a generator 140. An output 142 of the generator 140 provides a charging input 144 to a battery pack 150. Similarly, the fuel cell 120 includes an output 146 that in turn provides a charging input 148 to the battery pack 150. The battery pack 150 provides stored energy that is output as current 154 to electric drive motor(s) 160 that power one or more drive wheels 162 on the vehicle 102.

As can be appreciated, there are some vehicle operating situations where the ICE 110 is efficient and the fuel cell 120 is not efficient and other situations where the ICE 110 is not efficient and the fuel cell 120 is efficient. In this regard, and as described in further detail herein, the controller 124 of the hydrogen hybrid propulsion system 10 optimizes the charging of the battery pack 150 from the ICE 110 and/or the fuel cell 120 based on vehicle operating conditions received by the vehicle inputs 126. The control strategy provided herein maximizes the efficiency of both of the ICE 110 and the fuel cell 120 while minimizing emissions. In particular, each of the ICE 110 and the fuel cell 120 can have an associated hydrogen consumption versus power out efficiency.

The controller 124 determines how best to utilize each of the ICE 110 and fuel cell 120 to charge the battery pack 150 depending on operating conditions. By example only, should the driver request minimal power output of 15%, the controller 124 may determine that the fuel cell 120 should provide the charging input 148 to the battery pack 150 whereas should the driver request significant power output of 85%, the controller 124 may determine that the ICE 110 should provide the charging input 148 to the battery pack 150. Other control strategies can be followed based on an intent to follow a charge sustaining mode, a charge depleting mode and a charging mode. In this way, if the battery pack 150 is already substantially charged (85%-100%), it may be desirable to only charge the battery 150 using peak efficiency charging methods.

Similarly, it may be determined that the battery pack 150 is charged at an acceptable level where no charging input 144 from the ICE 110 or 148 from the fuel cell 120 is needed. If the battery pack 150 is at a nominal charge level such as 50%, the controller 124 can determine which of the ICE 110 or the fuel cell 120 is best suited to more efficiently provide (best power out for least hydrogen used) the charging input to the battery pack 150. It will further be appreciated that in some examples the battery pack 150 can be concurrently receiving a level of charging input 144 from the ICE 110 and a level of charging input 148 from the fuel cell 120. Moreover, while the ICE 110 and the fuel cell 120 are generally schematically represented in parallel in FIG. 1, they may be arranged in series.

In examples, over 75% of thermal energy of a fuel cell system goes into the coolant that cools the fuel cell system. In one arrangement, a coolant outlet of the fuel cell 120 can be arranged in series with the ICE 110 to dissipate thermal energy away from the ICE 110. In such configuration, a smaller radiator packaging can be used and a more efficient thermal management of the ICE 110 can result.

Figure 2A:
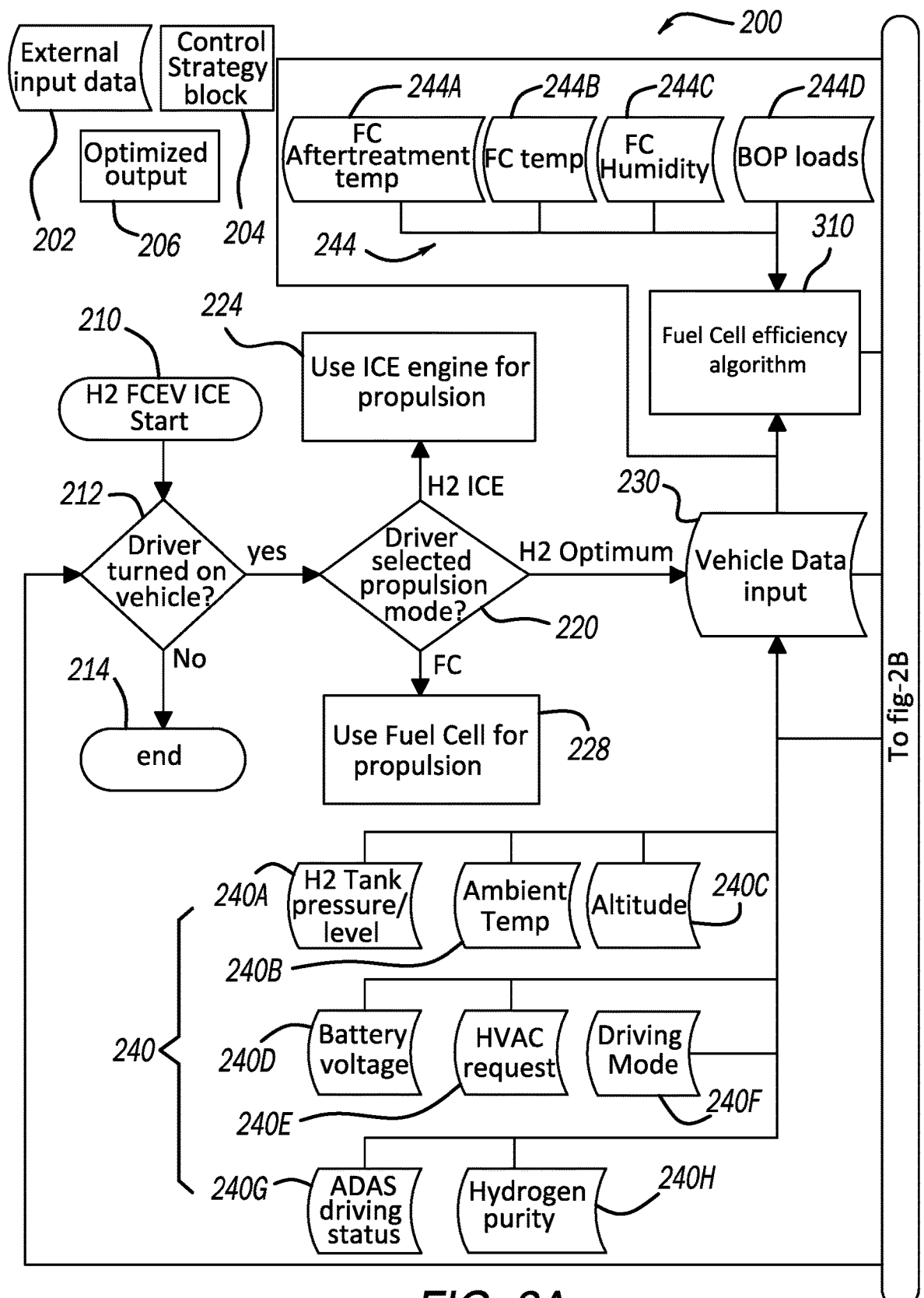
FIGS. 2A and 2B are an exemplary control logic flow for operating the hydrogen hybrid propulsion system of FIG. 1.
Figure 2B:
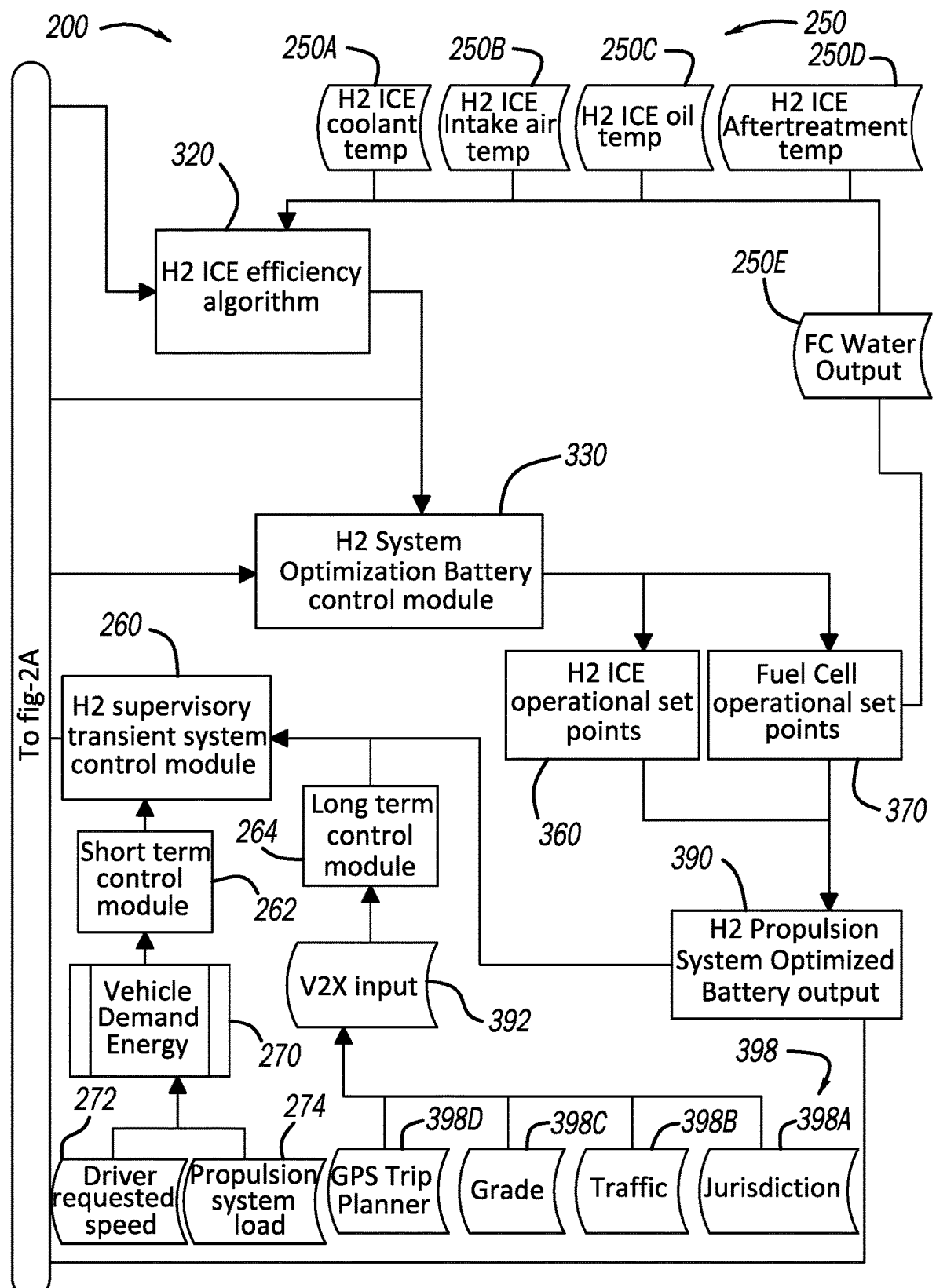

Turning now to FIGS. 2A and 2B, an exemplary control strategy 200 for controlling operation of the hydrogen hybrid propulsion system 100 will be described. In general, the control strategy 200, executed by the controller 124, includes external input data 202, control strategy blocks 204 and an optimized output 206. At 210 the fuel cell electric vehicle (FCEV) ICE 102 is started. At 212, control determines if the driver has turned the vehicle 102 on. If the vehicle 102 is not turned on, control ends at 214. If the vehicle 102 is on, control determines if the driver has selected a propulsion mode at 220. In examples, the driver can select a mode for using zero emissions in areas where laws prevent ICE use or in locations where the customer may choose to be zero emissions like national parks or other areas. In other examples, the drive may choose to use the ICE in very cold climates to heat the interior of the vehicle faster.

If control determines that the driver has selected the ICE 110 for propulsion, control proceeds to 224 where the ICE engine 110 is used for propulsion. If control determines that the driver has selected the fuel cell 120 for propulsion, control proceeds to 228 where the fuel cell 120 is used for propulsion. It is appreciated that in some locations/jurisdictions it is required to use a non-ICE engine. If the driver has not specifically requested dedicated propulsion from either of the ICE 110 or the fuel cell 120, control defaults for optimized hydrogen propulsion mode.

A vehicle data input 230 receives the request for optimized hydrogen propulsion mode and vehicle inputs collectively identified at 240. The vehicle inputs 240 can include a hydrogen tank pressure input 240A of the storage tank 230, an ambient temperature input 240B, an altitude input 240C, a battery voltage input 240D of the battery pack 150, a heating ventilation and air conditioning (HVAC) request input 240E, a driving mode (snow, sand, mud, sport, etc.) input 240F, an advanced driver assistance system (ADAS) driving status and a hydrogen purity input 240H. It is appreciated that additional or fewer inputs can be used for the vehicle inputs 240.

In advantages, the hydrogen purity input 240H can detect a hydrogen quality of the hydrogen in the storage tank 130. As is known, fuel cells require a higher quality hydrogen than hydrogen suitable to power an ICE. Control can determine if a hydrogen quality is below a threshold, that the vehicle 102 operate in ICE driving mode whereby the less than pure hydrogen can be used.

The vehicle data input 230 also receives inputs from a hydrogen supervisory transient system control module 260. The hydrogen supervisory transient system control module 260 receives an input from a short term control module 262 and a long term control module 264. The short term control module 262 can provide an output used such as when a user requests a wide open throttle. The long term control module 264 can be used such as when the vehicle 102 is operating up a long grade or encountering other longer term terrain. Vehicle demand energy 270 provides an input to the short term control module 262 based on a driver requested speed 272 and a propulsion system load 274. The driver requested speed 272 can relate to a driver accelerator pedal input for example. The propulsion system load 274 can be proportional to a type of heavy duty vehicle.

Returning now to the vehicle data input 230 (FIG. 2A), the vehicle input data 240 and the supervisory transient system control 260 are received at the vehicle data input 230. Control then proceeds to a fuel cell efficiency algorithm 310 and an ICE efficiency algorithm 320. The fuel cell efficiency algorithm 310 and the ICE efficiency algorithms 320 receive fuel cell inputs 244 and ICE inputs 250, respectively. In examples, the fuel cell efficiency algorithm 310 receives fuel cell inputs 244 including a fuel cell aftertreatment temperature input 244A, a fuel cell temperature input 244B, a fuel cell humidity input 244C and a balance of plant (BOP) load input 244D. Other inputs can be used.

The fuel cell aftertreatment temperature input 244A, the fuel cell temperature input 244B and the fuel cell humidity input 244C can each be provided from various sensors on the fuel cell 120 providing the vehicle inputs 126. The BOP load input 244D represents measurables related to the air and the hydrogen that is input into the fuel cell 120 (such as a humidifier, a compressor and various electrical management modules) during operation. The fuel cell aftertreatment temperature input 244A can be used when it may be desired to avoid creating water (as is a known byproduct of fuel cell operation), such as during a cold start in a cold weather climate.

The ICE efficiency algorithm 320 receives ICE inputs 250 including an ICE coolant temperature 250A, an ICE intake air temperature input 250B, an ICE oil temperature input 250C, an ICE aftertreatment temperature input 250D and a fuel cell water output 250E. The fuel cell water output 250E can be used for water injection on the ICE engine 110, which helps cool combustion and reduce NOx emissions. The ICE coolant temperature 250A, an ICE intake air temperature input 250B, an ICE oil temperature input 250C, an ICE aftertreatment temperature input 250D can each be provided from various sensors on the ICE 110 providing the vehicle inputs 126. Again, other inputs can be used.

Control now has the vehicle inputs 240, the fuel cell efficiency provided by the fuel cell efficiency algorithm 310 and the ICE efficiency provided by the ICE efficiency algorithm 320 that are all fed into a hydrogen system optimization battery control module 330. The hydrogen system optimization battery control module 330 determines the most efficient and effective use of the hydrogen fuel in the storage tank 130 based on the vehicle inputs, the fuel cell efficiency and ICE efficiency.

The hydrogen system optimization battery control module 330 outputs an ICE operational set point 360 and a fuel cell operational set point 370 based on the vehicle data input 230, the fuel cell efficiency output by the fuel cell efficiency algorithm 210 and the ICE efficiency output by the ICE efficiency algorithm 320. In examples, the ICE operational set point 360 can be between 0% and 100% operation of the ICE 110. Similarly, the fuel cell operational set point can be between 0% and 100%. The respective ICE operational set point 360 and fuel cell operational set point 370 are input into the hydrogen propulsion system optimized battery output module 390 that determines the levels of charging inputs 144 and 148 provided into the battery pack 150 from either of the respective generator 140 (driven by the ICE 110) and the fuel cell 120.

An output of the hydrogen propulsion system optimized battery output module 390 loops into the supervisory transient system control 260. In addition, as identified above, the long term control module 264 provides an input into the supervisory transient system control 260. The output of the long term control module 264 can be determined based on a vehicle to anything (V2X) input 392 resulting from various external inputs 398. The geographical inputs 398 can be provided by a vehicle global positioning sensor (GPS) that receives over-the-air updated information regarding the location and environment the vehicle 102 is operating in. The geographical inputs 398 can additionally or alternatively be provided by a user's cellular phone. In examples, the geographical inputs 398 can include a jurisdiction input 398A, a traffic input 398B, a grade input 398C, and a GPS trip planner input 398D. Other inputs can be used.

The long term control module 264 can anticipate various future driving situations and provide inputs to the supervisory transient system control 260 to proactively react. By way of example, should a vehicle GPS include a particular route that the vehicle 102 will be travelling, various environmental conditions (steep grade, traffic information, wind information, jurisdiction, high altitude, etc.) are known and the supervisory transient system control 260 can provide an output wherein the hydrogen system optimization battery control 330 can ultimately react to it to provide the ICE operational set points 360 and fuel cell operational set points 370 based on route conditions captured in the V2X input 392.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid propulsion system for a vehicle, the hybrid propulsion system comprising:
   an internal combustion engine (ICE) having a first output that drives a generator, the generator providing a first output voltage;
   a fuel cell having a second output providing a second output voltage;
   a hydrogen storage tank configured to store hydrogen and selectively and alternatively supply the hydrogen to both of the ICE and the fuel cell;
   a battery pack that selectively and alternatively receives the first and second output voltage to charge the battery pack;
   an electric drive motor that receives power from the battery pack to drive a drive wheel of the vehicle to propel the vehicle; and
   a controller that receives vehicle inputs and determines operational set points of the ICE and the fuel cell representative of an amount of the first and second output voltages to direct to the battery pack based on operating conditions.

2. The hybrid propulsion system of claim 1, wherein the controller further comprises:
   a hydrogen system optimization battery control module that determines an optimized battery output based on the operational set points of the ICE and the fuel cell.

3. The hybrid propulsion system of claim 2, wherein the operational set points of the ICE and the fuel cell are consistent with an amount of hydrogen delivered to the ICE and the fuel cell.

4. The hybrid propulsion system of claim 3, wherein the hydrogen system optimization battery control module receives a first input from a fuel cell efficiency algorithm that determines an optimal operating efficiency of the fuel cell based on the operating conditions.

5. The hybrid propulsion system of claim 4, wherein the operating conditions comprise fuel cell operating inputs including at least one of a fuel cell aftertreatment temperature input, a fuel cell temperature input, a fuel cell humidity input, and a balance of plant (BOP) load input.

6. The hybrid propulsion system of claim 4, wherein the hydrogen optimization battery control module receives a second input from an ICE efficiency algorithm that determines an optimal operating efficiency of the ICE based on the operating conditions.

7. The hybrid propulsion system of claim 6, wherein the operating conditions comprise ICE operating inputs including at least one of an ICE coolant temperature, an ICE intake air temperature input, an ICE oil temperature input, an ICE aftertreatment temperature input, and a fuel cell water output.

8. The hybrid propulsion system of claim 7, wherein the hydrogen optimization battery control module receives a third input from vehicle data input including at least one of a hydrogen tank pressure input of the storage tank, an ambient temperature input, an altitude input, a battery voltage input of the battery pack, a heating ventilation and air conditioning (HVAC) request input, a driving mode input, an advanced driver assistance system (ADAS) driving status and a hydrogen purity input, wherein the propulsion system optimized battery output is further based on the third input.

9. The hybrid propulsion system of claim 8, wherein the hydrogen optimization battery control module receives a fourth input from a hydrogen supervisory transient system control module, the fourth input based on inputs from a short term control module representative of short term driving conditions and a long term control module representative of long term driving conditions.

10. The hybrid propulsion system of claim 9, wherein the short term control module determines a vehicle demand energy based on at least one of a driver requested speed and a propulsion system load.

11. The hybrid propulsion system of claim 10, wherein the long term control module provides the input to the hydrogen optimization battery control module based on external geographical inputs comprising at least one of a jurisdiction input, a traffic input, a grade input, and a GPS trip planner input.

12. A method of operating a hybrid propulsion system for a vehicle, the hybrid propulsion system including an internal combustion engine (ICE) and a fuel cell, the ICE having a first output that drives a generator, the generator providing a first output voltage to a battery pack, the fuel cell having a second output providing a second output voltage to the battery pack, the method comprising:
   determining an optimal operating efficiency of the fuel cell based on operating conditions;
   determining an optimal operating efficiency of the ICE based on operating conditions;
   receiving, at a hydrogen system optimization battery control module, the optimal operating efficiencies of the fuel cell and the ICE and determining an optimized battery output including operational set points of the fuel cell and the ICE based on the optimal operating efficiencies of the fuel cell and the ICE; and
   operating, selectively and alternatively, the fuel cell and the ICE based on the operational set points of the fuel cell and the ICE.

13. The method of claim 12, wherein the operational set points of the ICE and the fuel cell are consistent with an amount of hydrogen delivered to the ICE and the fuel cell.

14. The method of claim 13, wherein the operating conditions comprise fuel cell operating inputs including at least one of a fuel cell aftertreatment temperature input, a fuel cell temperature input, a fuel cell humidity input, and a balance of plant (BOP) load input.

15. The method of claim 14, wherein the operating conditions comprise ICE operating inputs including at least one of an ICE coolant temperature, an ICE intake air temperature input, an ICE oil temperature input, an ICE aftertreatment temperature input, and a fuel cell water output.

16. The method of claim 15, wherein the hydrogen optimization battery control module receives a vehicle data input including at least one of a hydrogen tank pressure input of the storage tank, an ambient temperature input, an altitude input, a battery voltage input of the battery pack, a heating ventilation and air conditioning (HVAC) request input, a driving mode input, an advanced driver assistance system (ADAS) driving status and a hydrogen purity input.

* * * * *